United States Patent
LaBella et al.

(10) Patent No.: US 7,286,498 B1
(45) Date of Patent: Oct. 23, 2007

(54) VALIDATION METHOD AND DATA STRUCTURES FOR WIRELESS COMMUNICATIONS

(75) Inventors: Vincent P. LaBella, Cohoes, NY (US); Paul Thibado, Fayetteville, AR (US)

(73) Assignee: H-ITT, LLC, Cocoa, FL (US)

( * ) Notice: Subject to any disclaimer, the term of this patent is extended or adjusted under 35 U.S.C. 154(b) by 241 days.

(21) Appl. No.: 11/200,508

(22) Filed: Aug. 9, 2005

(51) Int. Cl.
 *H04H 1/00* (2006.01)
(52) U.S. Cl. .............. 370/312; 370/313; 370/379; 370/476
(58) Field of Classification Search ............ 370/312, 370/313, 474, 476, 472, 346, 335, 333, 300, 370/269, 379, 382; 455/412.1, 412.2
 See application file for complete search history.

(56) References Cited

U.S. PATENT DOCUMENTS

| | | | |
|---|---|---|---|
| 3,445,815 A | 5/1969 | Saltzberg et al. ......... 340/163 |
| 4,048,729 A | 9/1977 | Derks ........................ 35/8 |
| 4,290,141 A | 9/1981 | Anderson et al. ........... 455/2 |
| 4,377,870 A * | 3/1983 | Anderson et al. .......... 725/24 |
| 4,493,655 A | 1/1985 | Groff ....................... 434/351 |
| 5,093,786 A | 3/1992 | Derks ...................... 395/800 |
| 5,226,177 A | 7/1993 | Nickerson ................. 455/2 |
| 5,273,437 A * | 12/1993 | Caldwell et al. .......... 434/351 |
| RE35,449 E | 2/1997 | Derks ...................... 395/800 |
| 5,724,357 A * | 3/1998 | Derks ....................... 370/313 |
| 5,870,214 A | 2/1999 | Knowles .................... 359/152 |
| 6,181,910 B1 | 1/2001 | Jerrold-Jones et al. ..... 434/353 |
| 6,628,918 B2 | 9/2003 | Roschelle et al. .......... 434/350 |
| 7,024,640 B2 * | 4/2006 | Buchanan .................. 716/4 |
| 7,043,433 B2 * | 5/2006 | Hejna, Jr. .................. 704/270 |
| 2004/0054501 A1 * | 3/2004 | Barthel et al. ............. 702/182 |
| 2005/0254584 A1 * | 11/2005 | Kim et al. ............. 375/240.27 |

* cited by examiner

*Primary Examiner*—Matthew Anderson
*Assistant Examiner*—Tan Trinh
(74) *Attorney, Agent, or Firm*—Keisling Pieper & Scott PLC; David B. Pieper; Trent C. Keisling (57) ABSTRACT

A response monitoring apparatus using a remote including an electrical circuit including a user activated input, a transmitter, and a receiver, where the electrical circuit is adapted to detect operation of the user activated input and temporarily activates the receiver. A validation and error checking system ensures valid transmissions occurring in both wireless and wired communications. The validation and error checking system retrieves data from the remote memory to create transmission data groups. The validation and error checking system calculates a checksum value for the transmission data groups and creates a checksum data group that includes the checksum. The validation and error checking system transmits the data and ensures that the data is properly sent. The tests to determine valid transmission include checking particular bits of the transmitted data, calculating a checksum and comparing it to the transmitted checksum, and transmitting two or more data packets and comparing the values of the packets.

15 Claims, 9 Drawing Sheets

VALIDATION METHOD AND DATA STRUCTURES FOR WIRELESS COMMUNICATIONS

CROSS-REFERENCE TO RELATED APPLICATIONS

Not Applicable

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to the field of communication response systems. In particular, the present invention relates specifically to audience response systems and is particularly adapted to classroom type environments. Known art may be found in U.S. Class 370, Multiplex Communications, Subclass 312, Message addressed to multiple destinations. Class 434, Education and Demonstration, Subclass 335, By means including electrical component, Subclass 336, Response of plural examinees communicated to monitor or recorder by electrical signals, Subclass 350, Response of plural examinee's communicated to monitor or recorder by electrical signals, Subclass 351, Wireless signals. Class 455, Telecommunications, Subclass 2.01, Audience survey or program distribution use accounting, Subclass 3.05, Two-way, Subclass 458, Specific paging technique, and Subclass 500, Plural transmitters or receivers. Additional art may also be found in other classes and subclasses.

2. Description of the Known Art

As will be appreciated by those skilled in the art, communication systems take a variety of approaches. Patents disclosing information relevant to different communication systems include U.S. Pat. No. RE35,449, issued to Derks on Feb. 11, 1997; U.S. Pat. No. 3,445,815, issued to Saltzberg et al. on May 20, 1969; U.S. Pat. No. 4,048,729, issued to Derks on Sep. 20, 1977; U.S. Pat. No. 4,290,141, issued to Anderson et al. on Sep. 15, 1981; U.S. Pat. No. 4,377,870, issued to Anderson et al. on Mar. 22, 1983; U.S. Pat. No. 4,493,655, issued to Groff on Jan. 15, 1985; U.S. Pat. No. 5,093,786, issued to Derks on Mar. 3, 1992; U.S. Pat. No. 5,226,177, issued to Nickerson on Jul. 6, 1993; U.S. Pat. No. 5,273,437, issued to Caldwell et al. on Dec. 28, 1993; U.S. Pat. No. 5,724,357, issued to Derks on Mar. 3, 1998; U.S. Pat. No. 5,870,214, issued to Knowles on Feb. 9, 1999; U.S. Pat. No. 6,181,910, issued to Jerrold-Jones et al. on Jan. 30, 2001; and U.S. Pat. No. 6,628,918, issued to Roschelle et al. on Sep. 30, 2003. Each of these patents is hereby expressly incorporated by reference in its entirety. Abstract information of the above-listed patents are noted as follows:

U.S. Pat. No. RE35,449 issued to Derks on Feb. 11, 1997 discloses a remote response system includes a central control unit and a plurality of remotely-located response units each having keypads for entering a selection from a user. The central control unit sequentially transmits distinct address words and includes redundant receivers for receiving data words transmitted by response units. Each response unit becomes powered-up upon the entry of a user response and transmits a data word, corresponding to the user selection, upon receipt of its unique address word. The central control unit examines the validity of each data bit received and the validity of an entire data word to determine if both a character and its complement are received. If a valid data word is received, the central control unit transmits an acknowledge bit, which powers-down the response unit that sent the valid word. Each response unit transmits its data word simultaneously with the central control unit transmitting the address word for the next unit that is to respond with the transmissions occurring over distinct frequency channels. A clock signal for controlling data word serial bit transmission is derived at each response unit from the address word signal.

U.S. Pat. No. 3,445,815 issued to Saltzberg et al. on May 20, 1969 discloses a binary sequence which is generated to be used as an address coding system for identifying a particular remote station to be controlled. The remote stations are identified by subsequences having fewer bits than the entire sequence and the entire sequence is so constructed that no subsequence is repeated in the sequence. Thus, an identifying code of a large number of bits for security purposes can be used to address each station yet only a single additional bit need be transmitted to address each subsequent station.

U.S. Pat. No. 4,048,729 issued to Derks on Sep. 20, 1977 discloses a wireless electrical teaching system which includes an instructor operated console with a plurality of lesson sources and means for transmitting the lesson source information to students, each having a transceiver unit which can be used to select one of the desired lesson sources. The console includes means for generating a unique student identification code transmitted on a common carrier frequency for all students but identifying an individual student for purposes of monitoring the student's progress during a lesson or for intercommunications between the instructor and a student. Each of the student transceivers include code detecting means responsive only to the unique code identifying the student for generating a control signal which actuates a student transmitter for transmitting the student's voice back to the instructor during a monitoring mode of operation. The console also includes an intercom transmission circuit and a circuit for modifying the student code. The student's transceiver includes control means for automatically muting the lesson source when a modified code is received and tuning the student receiver to the intercom transmission circuit permitting intercommunications between the instructor and the student at the same adjustable audio level as the lesson source selected by the student.

U.S. Pat. No. 4,290,141 issued to Anderson et al. on Sep. 15, 1981 discloses an electronic voting system which includes a plurality of wireless response units, each response unit capable of transmitting several different digitally coded signals. Each of these digitally coded signals corresponds to the response of a person responding to a given stimulus.

Each response unit transmits a selected digitally coded response via a radio frequency signal during one of a series of time intervals, a different time interval corresponding to each of the response units. An interrogating and response processing unit signals the response units to commence response transmission and receives, processes and displays the transmitted responses for observation by selected persons.

U.S. Pat. No. 4,377,870 issued to Anderson et al. on Mar. 22, 1983 discloses an audience polling system which includes a plurality of wireless transmitters, each transmitter capable of transmitting a pulse of electromagnetic energy on a selected one of a group of predetermined frequencies. Each frequency selected on which to transmit corresponds to one of a group of suggested responses to a given stimulus. The polling system includes a receiver for receiving the transmitted pulses and electronic counters for tallying the number of pulses received on each of the selected frequencies. An electronic display presents the results of the tallying for observation by the audience or others.

U.S. Pat. No. 4,493,655 issued to Groff on Jan. 15, 1985 discloses a radio-controlled teaching device comprising a teacher transmitter unit and a plurality of student receiver units for maintaining student alertness during oral reading of written textual material, for the oral administration of multiple-choice or true or false test material, and for the preparation and presentation of recorded programmed instructional material. The teacher transmitter unit contains a tone generator and radio transmitter which transmits discrete tone signals, either under manual control of the teacher or automatically under the control of a plural channel instructional tape recording. Each student receiver unit contains timers, a logic circuit, and a radio receiver which receives the above tone signals (which are transparent to the students) and provides a short time period during which the student is expected to respond by briefly closing a response switch. The short time periods correspond to portions of a text being orally read, such as the end of a paragraph, proper nouns, verbs, etc., which the teacher wishes to emphasize, or to the correct answer of a multiple-choice or true or false question which is also being orally read, or to a designated point within a recorded programmed lesson which is being played back by a tape player. If the student responds during the above time period, he receives a "right" score which is displayed on a digital readout. If the student responds at any time other than the above time period, he receives a "wrong" score which is also displayed. Whether or not the teacher wishes to record the scores, the students are aware they are individually challenged by the teaching device.

U.S. Pat. No. 5,093,786 issued to Derks on Mar. 3, 1992 discloses a remote response system which includes a central control unit and a plurality of remotely-located response units each having keypads for entering a selection from a user. The central control unit sequentially transmits distinct address words and includes redundant receivers for receiving data words transmitted by response units. Each response unit becomes powered-up upon the entry of a user response and transmits a data word, corresponding to the user selection, upon receipt of its unique address word. The central control unit examines the validity of each data bit received and the validity of an entire data word to determine if both a character and its complement are received. If a valid data word is received, the central control unit transmits an acknowledge bit, which powers-down the response unit that sent the valid word. Each response unit transmits its data word simultaneously with the central control unit transmitting the address word for the next unit that is to respond with the transmissions occurring over distinct frequency channels. A clock signal for controlling data word serial bit transmission is derived at each response unit from the address word signal.

U.S. Pat. No. 5,226,177 issued to Nickerson on Jul. 6, 1993 discloses a system for collecting data from a plurality of respondents having a central portion with a central processor and a base station and a remote portion with a plurality of wireless response units for respondents to be prompted to enter response data to a visually perceptible display which may be shown live, on a television monitor or may be taped. The display may include multiple choice questions. The central processor accumulates the response data via radio, optical or acoustic communication links with the remote units, each of which has a unique address. The central processor displays the accumulated response data in real time and may overlay the processed response data and originate display shown to the respondents.

U.S. Pat. No. 5,273,437 issued to Caldwell et al. on Dec. 28, 1993 discloses an audience participation system and method utilizing wireless transmission which is provided. The system includes a plurality of modules in the possession of an audience, each module having a keypad or other means which is activated by a member of the audience in order for the audience to respond to a question posed by the speaker during his presentation. After the speaker poses a question, the audience responds by supplying information through a physical input into the module. The module then encodes the information provided into an encoded electrical pattern. This encoded electrical pattern is modulated into an electromagnetic signal which is then electromagnetically transmitted. A base station has a receiver for capturing the electromagnetic signal which is then demodulated into the encoded electrical pattern originally transmitted. The data are retrieved and collected, and then statistically analyzed according to the wishes of the speaker and displayed to present a statistical analysis of the combined audience response to the question posed.

U.S. Pat. No. 5,724,357 issued to Derks on Mar. 3, 1998 discloses a wireless remote response system that includes a base unit which retrieves user-entered responses from a plurality of remote response units, each of which is provided to a user. The base unit transmits a base data package over a wireless communication link to the plurality of remote response units, which decode the base packet and load into memory a portion of the decoded base package at each response unit. Each response unit examines the characters loaded into the memory and determines any character in the portion of the decoded base package that pertains to that particular response unit. Each remote response unit then processes any character that pertains to that particular response unit. Each bit of data exchanged between the base unit and the response unit is encoded as a particular time interval for at least one cycle of a periodic waveform by varying the time interval either between successive rising edges or between successive falling edges of the periodic waveform. Decoding is carried out by measuring the time intervals between rising edges or between falling edges of successive waveforms. It is then determined whether each measured time interval falls within one of at least two distinct non-overlapping time ranges in order to determine a value of each bit.

U.S. Pat. No. 5,870,214 issued to Knowles on Feb. 9, 1999 discloses a signal transmission system which comprises a transmitter arranged to transmit a coded signal as a series of pulses of line of sight radiation having a predetermined minimum interval therebetween, a receiver responsive to such radiated pulses received at a corresponding minimum interval, and a plurality of repeater devices. Each repeater device comprises a radiation receiving element, a radiation transmitting element, and means responsive to receipt of a pulse of transmitted energy by said receiving element for causing said transmitting element to emit a corresponding pulse of transmitted energy and for causing said receiving element to be disabled for a predetermined period of time corresponding to at least a multiple of the duration of the pulse transmitted by said transmitting element. A plurality of the repeater devices can thus be arrayed between said transmitter and receiver to provide a plurality of line of sight radiation propagation paths with a plurality of repeaters each in line of sight of the transmitter and/or other repeaters and with the receiver in line of sight of a plurality of said repeaters so that random interruption of the signal propagation paths does not interrupt the transmitted signal. Each repeater may comprise its own transmitter and key pad to provide an audience polling system.

U.S. Pat. No. 6,181,910 issued to Jerrold-Jones et al. on Jan. 30, 2001 discloses an examination scoring system which comprises an independent, portable hand-held remote scoring unit (preferably owned by the student) having the capability to download answers stored therein without the need for an expensive docking station, and having the capability to transmit answers to the central scoring computer without the presence or assistance of the instructor or proctor. The system is particularly advantageous in that it provides the opportunity for the student to receive immediate scoring results to his or her remote scoring unit, and the remote scoring unit is designed to minimize the possibility of cheating.

U.S. Pat. No. 6,628,918 issued to Roschelle et al. on Sep. 30, 2003 discloses a system, method and computer program product which are provided for giving feedback in an educational environment using networked devices. Initially, an image stimulus is displayed to a plurality of individual group members regarding material being presented by a group leader utilizing a plurality of networked devices operated by the group members. Thereafter, feedback is received from the individual group members in response to the image stimulus utilizing the networked devices. The feedback is then aggregated after which the aggregated feedback is transmitted to the networked device operated by the group leader. Such aggregated feedback reflects the feedback received from each of the individual group members for allowing the group leader to view the aggregated feedback.

The prior art does not address issues facing proper transmissions of information through infrared communications. The problem with infrared remotes is that it is difficult to transmit data without encountering errors. The described invention implements a sophisticated error checking scheme that eliminates infrared transmission errors in an efficient and cost effective manner. The error checking scheme is implemented with minimal hardware in order to reduce costs and is robust enough to handle thousands of users.

The present invention's apparatus, method, and process of control does not appear to be taught by this prior art. Thus, it may be seen that these prior art patents are very limited in their teaching and utilization, and an improved audience response system is needed to overcome these limitations.

SUMMARY OF THE INVENTION

The present invention is directed to improved response systems. In accordance with one exemplary embodiment of the present invention, a response monitoring apparatus and method is provided using a remote transceiver including an electrical circuit having at least a user activated input, a transmitter, and a receiver, where the electrical circuit can detect operation of the user activated input and temporarily activate the receiver. This temporary receiver activation allows for the conservation of battery power for the remotes so that they may work for an extended period of time. Of particular note is the activation of the receiver and the termination of the receiver power drain by either the end of a time activation period or the receipt, validation, or command carried by a confirmation signal.

Each remote transceiver transmits two scrambled data packets to a base transceiver separate from the remote transceivers. The scrambling of the data packets is predetermined positional translation of the bits of each data packet. Each data packet consists of 4 transmission data groups and a checksum data group. The last data group of each packet consists of a checksum to ensure that the packet is correctly transmitted by the remote transceivers and received by the base transceivers. Each data packet is scrambled so that the information sent from the remote transceivers to the base transceiver cannot be intercepted and decoded by others. Particular bits of each byte are preset so that the base transceiver can properly determine when a new packet is received and can properly distinguish between the two packets.

The two packets contain the same type of information. However, the information is dispersed differently throughout each byte of the packet. Furthermore, the bits are inverted in one packet and not inverted in the other. Because the two packets contain the same information dispersed differently and inverted, the two packets can be used to determine that the correct information is properly transmitted throughout the invention.

After the information is properly received by the base transceiver, the base transceiver checks at least one of the packets for the proper form. The base transceiver checks the form by looking for particular bits that should be set to certain values and by comparing the received checksum with the calculated checksum. If the base transceiver does not receive a packet of the proper form, the base transceiver discards the received packets.

If the packet is in the proper form, the base transceiver discards the old checksum data groups. The base transceiver scrambles the transmission data groups a second time and calculates a new checksum to create two new packets. The scrambling of the data packets is a predetermined positional translation of the bits of each data packet. The base transceiver then transmits the two newly scrambled packets to the computer. The base transceiver also sends a message back to the remote that a valid packet has been received and prevents the remote from transmitting more data for a period of time.

The base transceiver scrambles the received data packets differently than the remote transceivers. However, the base transceiver continues to use the same bits to ensure that the packets are in the proper form. The computer then receives the two data packets from the base transceiver. The computer checks to see if at least one of the data packets is in the correct form.

If at least one of the data packets is in the correct form, the computer decodes the data packets to determine the values transmitted by the remote transceiver. If the values obtained from the transmission data groups from both packets match, the computer acknowledges that it has received a valid transmission by either transmitting data back to the remote or by displaying a message on a screen. If the packets are not in the proper form or the values obtained from both packets do not match, the computer will retain the packets for a certain period of time and continue to receive additional packets to compare the transmission data groups until a proper match is found.

The present invention creates an interactive classroom in which teachers and professors can encourage classroom participation in order to enhance the learning environment. By using infrared communications, the present invention requires users to be in the same classroom. Unlike a radio frequency system, an infrared response system requires users to attend classes in order to answer questions. Students or other users will not be able to answer the questions unless they are actually in the classroom thus eliminating possible cheating. Furthermore, infrared communications are not disturbed by transmissions from other wireless networking communication devices, such as wireless ethernet (wifi), cell phones, walkie-talkies, cordless microphones, PDA's, and other similar devices. The invention also allows comparable functionality to RF systems at a much lower cost.

Advantages of the present invention include the ability to eliminate infrared transmission errors with a sophisticated error checking scheme. The error checking scheme eliminates communication errors allowing for an increased number of users to be present in a single classroom. The error checking scheme is robust enough to handle thousands of users in a single room. The error checking scheme allows the system to receive all transmissions sent by users and still be effective in decoding each user's response without encountering transmission errors causing incorrect data to be received.

The error checking scheme is also simple enough that it can be implemented with minimal hardware. The error checking scheme ensures that correct values are transmitted without bogging the system down with processing time and increased hardware. The error checking scheme allows for the invention to be produced in a cost effective manner that can handle over thousands of users in a single classroom.

By eliminating the errors caused by infrared transmissions and validating the transmissions, the present invention enables a classroom response system that ensures it has received proper responses from over thousands of users at a fraction of the cost of other systems.

Advantages of the present invention include: increased battery life due to reduced receiver drain, improved communications by using blanket transmission techniques, user feed back at the remotes, and multiple channel communications using different speed transmissions to eliminate cross talk and timing problems, activation code control of receivers and associated sensory output devices, revised base units with backward capacity capability and a method for utilizing the new developments in responsive audience environment.

It is an object of the invention to eliminate errors caused by infrared transmissions involving multiple users.

Furthermore, it is an object of the invention to transmit data between a remote and a receiver so that the data can not be easily intercepted and decoded.

Furthermore, it is an object of the invention to inexpensively decode data so that the data can be securely transmitted through wireless communications.

Furthermore, it is an object of the invention to provide a method to validate the transmitted packets to ensure that the data is properly sent to and received by the base transceiver.

Furthermore, it is an object of the invention to use two different data packets to ensure data consistency of the information transmitted by the remotes.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
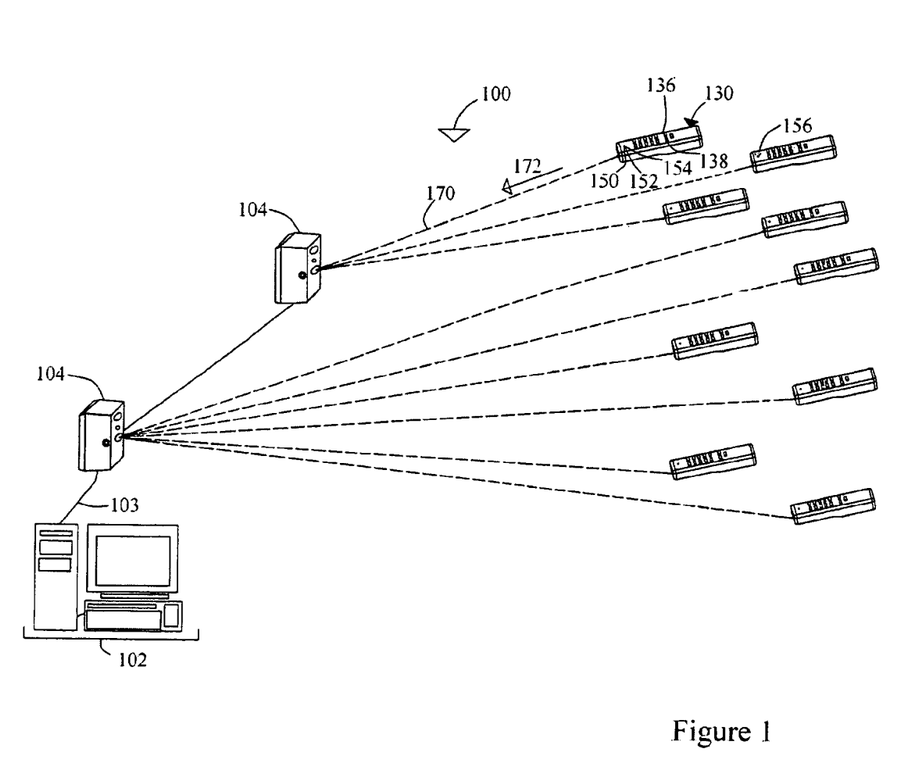
FIG. 1 is a schematic diagram of multiple user remotes communicating with a base connected to a central processing system.

As shown in FIG. 1 of the drawings, one exemplary embodiment of the present invention is generally shown as a response monitoring apparatus 100. FIG. 1 shows multiple user remote transceivers 130 communicating with a base transceiver 104 connected to a central processing system 102. In this Figure it may be understood that the base transceiver 104 is receiving signals from the remote transceivers 130 including a remote source data packet 170. The remote transceivers are transmitting at a first data speed 172, also known as a remote source data speed 172. The signals sent to the base transceiver can be sent via any type of wireless or wired transfer of information. In one embodiment, the base transceiver is connected to a central processing system in order to allow communication between the two. In another embodiment, the base transceiver and the central processing system communicate wirelessly.

From the basic elements, the operation of the invention may be easily understood. As shown in FIG. 1, the present invention allows each student or user to communicate with a central processing unit 102. Each student uses a hand-held transceiver 130 which has a unique ID number. With this remote control transceiver 130, each student responds to the instructor's multiple-choice questions by aiming it at wall-mounted base transceivers 104. The base transceivers 104 collect the signals 170 and send them to the central processing system 102 such as a Windows or Macintosh PC through an output port (see FIG. 3) such as a COM or USB port that is running an acquisition program.

The hand-held transceiver 130 is used by audience members to respond to questions. It has thirteen buttons A/1 through J/0, left, right, and down. The remote transceiver 130 requires two AAA batteries 166 (FIG. 4) or some other type of battery, such as a 9V battery, or other power source and has about a ninety foot range. Each remote transceiver 130 has a unique ID number located on the printed circuit board underneath the batteries 166.

The wall mountable base transceiver 104 is used to collect signals from remote transceivers 130 and send the information to a central processing system 102 such as a PC. Base transceivers 104 include wall mounting hardware and approximately one base transceiver 104 is needed for every twenty-five remote transceivers 130 used in the classroom. The base transceivers 104 also come packaged in a box with instructions and mounting hardware. Cables are needed to connect the base transceivers 104 in a "daisy chain" to each other and to the central processing system 102. The range for a remote can be increased beyond 90 feet by daisy chaining multiple receivers together.

To run the software and display the results to the audience a standard Windows based PC and a computer projector of 800×600 (min) or 1024×768 (optimal) resolution is required. The software will also run on a Mac using virtual PC and a USB to COM port adaptor. Software provides a complete set of software tools for displaying questions, collecting responses, grading the results, associating student names with remote ID numbers, and exporting student points to a spreadsheet. Further description is not provided because this type of software is known and used in the industry.

The present invention provides a new remote transceiver 130 and base 104 with two-way infra-red link technology. This technology eliminates the need for a central display because the remote transceiver 130 indicates successful signal transmission with a sensory output device 150. An added bonus of this technology is faster response collection times based on the introduction of a high speed transmitting system and the use of a two-second "time out" 209 (See FIG. 5) once a student's response has been successfully recorded. This blocking of excess transmitted signals reduces signal traffic, thereby increasing system speed.

The new remote transceiver 130 offers even more flexibility and options to students and instructors. The remote transceiver 130 accommodates additional buttons 138 over the prior art. These buttons 138 create the ability to record digits and letters, as well as to move forward and back for indexing through test questions.

Operation of the system may be easily understood. The professor or instructor will ask the students to respond to a question, verbal or written. The students will aim their remote 130 at one of the bases 104 in the room. Note that the room could have several bases 104. The student will then press the button 138 that represents his answer. When a student presses a button 138 on the remote transceiver's key pad 136 (e.g. the letter "A"), the remote transceiver 130 sends two digital data packets 170 via the high-speed IR-LED 144. Thus, the remote 130 will send two high-speed digital data packets (~10 ms for ~100 bits of data) via a light signal 168 to the base 104 using an optical wavelength of about 850 nm. In another embodiment, the remote can send more or less information. The transmission time can increase or decrease according to the amount of data the remote transmits. For example, if the remote transmits 128 bits, the remote will need to transmit for a longer period of time than 10 ms.

After the user presses a button, the remote transceiver retrieves remote ID data, participant data, and supplemental system data from remote memory. The remote creates transmission data groups from the remote ID data, participant data, and the supplemental system data. The remote ID data consists of at least 8 bits, the participant data consists of at least 3 bits, and the supplemental system data consists of at least 2 bits. The retrieved data is used to form a set of at least 2 transmission data groups, each of at least 4 bits from all of the retrieved data. The transmission data groups contain all of the bits of the remote ID data, the participant data, and the supplemental system data. The bits in each transmission group are arranged in a manner that prevents sequences of consecutive bits in retrieved data from appearing as a transmission data group. Each data group includes at least one marker bit to identify the data group in the packet.

In one embodiment, the participant data is key identification data. The participant data consists of data obtained from a user of the remote. The supplemental system data can consist of information such as data to identify the type of remote that is in use. The supplemental system data can also consist of other data that could be needed to supplement the system.

The remote transceiver creates an additional data group, a checksum data group, consisting of at least 4 bits that are determined by binary calculation of the transmission data groups. The remote transceiver then forms a data packet from the transmission data groups and the checksum data group.

In one embodiment, each data packet 170 has forty bits of data including data encryption, multi-level data error checking, unique remote ID, and button pressed information. When these data packets 170 are received by a base transceiver 104, the base transceiver 104 will validate at least one of the data packets 170, preferably the first data packet.

The eighty bits of data sent by the remote 130 consists of two different packets each containing forty bits or five bytes. The two packets contain the same information for the remote ID, the supplemental system data, and the participant data. However, the information is dispersed differently in each packet. The first packet is the conjugate of the retrieved bits, the remote ID data, the supplemental system data, and the participant data. All of the bits are inverted except for the checksum. The checksum of the first packet is calculated with the inverted bytes. The second packet has the same information dispersed differently from the first packet and does not have any of the bits inverted. A checksum is calculated for both the first and second packet.

Each packet consists of 40 bits. Two of the forty bits, R1-R0, are remote type bits that identify the remote type. Four bits, K3-K0, are key identification bits that identify the keys. Twenty-one bits, I20-I0, are remote identification bits that identify which remote 130 is transmitting the data packet. The remote type bits, the key identification bits, and the remote identification bits are found in each packet. However, the bits are scrambled differently in each packet.

In another embodiment, the number of bits for each packet can increase or decrease. The number of bits associated with the remote type, the keys, and the remote identification number could vary according to the amount of information that needs to be transmitted for each piece of information. For example, if a person needs more than sixteen keys for the remote, an extra bit could be used to identify the keys of the remote.

The remaining thirteen bits of the packets are located in the same place in each packet. Seven bits, C6-C0, serve as the checksum to ensure that the data is properly transmitted to and received by the base transceivers. The remaining six bits are marker bits that are preset so that the receivers can properly identify the packets as each packet is received.

In another embodiment, the marker bits can also be scrambled throughout the packets by a predetermined method. By scrambling the packets, the base transceivers will have to unscramble the packets to determine the identification bits of each packet.

The remote type bits allow for four different types of remotes to be used with the system. The remote types can differ in the number of buttons on the remote, the layout of the buttons, the bit codes associated with each key press, the type of response a remote transceiver will make in connection with an answer, and many other changes that one reasonably skilled in the art could make. By being able to identify the remote type, the invention can interpret the key pressed by a user and how to respond to that remote. The remote type will remain constant with each individual remote. The remote type will also remain the same for every transmission made by one particular remote.

The key identification bits allow for a remote to contain up to sixteen different keys. Each key corresponds to a different bit code. For example, the "*" key could correspond to the bit code 0000. The "A" key could correspond to the bit code 0001. The "B" key could correspond to the bit code 0010. The "C" key could correspond to the bit code 0011. The "D" key could correspond with the bit code 0100. The "E" key could correspond with the bit code 0101, and so on. In another embodiment, each key could correspond with a different bit code.

The twenty-one remote identification bits allow for a maximum of 2,097,152 different remote identification numbers to properly function with the base transceiver. The remote identification number is printed on the circuit board of each remote transceiver. The remote will send the remote identification number with every transmission that it makes. The remote identification number is a constant, so the identification number for a remote will always remain the same. In another embodiment, the number of remote identification bits could be increased or decreased. By increasing the number of bits to identify the remote, the system will function with a greater number of remote IDs.

The checksum consists of seven bits of the last byte of each packet. The checksum does not include the most significant bit of the last byte of each packet. Several different methods can be used to calculate the checksum. The checksum can be calculated by the Cyclic Redundancy Check (CRC), the User Datagram Program (UDP), or any other method that is known by one ordinarily skilled in the art. In one embodiment, the checksum is calculated by adding the values of the transmission data groups. The checksum data group consisting of the checksum is the sum of the transmission data groups. The most significant bit of the checksum data group is not a bit reserved for the checksum. For example, if the first four bytes of the packet are as follows:

10110101

01011110

01100110

01100111

The checksum is the sum of the last seven bits of each of the previous four data groups. According to the above example, the last data group will be 0110000. The checksum is 110000. The checksum will be calculated as the last seven bits of the sum of the last seven bits of the transmission data groups of each packet. Any additional bits of the sum of the checksum data group will be truncated from the checksum. The most significant bit of the checksum data group (the first 0 of 0110000) should preferably be set to 0, as a marker bit, according to the invention. The checksum for each packet will vary according to the method in which the information has been dispersed throughout each packet. The number of bits of the checksum will vary according to the number of bits found in each transmission data group. Preferably, the number of bits in the transmission data group will have one additional bit, a marker bit, than the checksum. The checksum data group and the transmission data group will preferably have the same number of bits. In another embodiment, the number of bits in the checksum can be decreased. By decreasing the number of bits in the checksum, the checksum will allow fewer bits to be transmitted thus decreasing the amount of time needed to transmit and process the data.

The number of marker bits varies according to the number of data groups. In one embodiment, a marker bit should preferably be in each data group, the transmission data groups and the checksum data group. In one embodiment, the invention uses six marker bits. The six marker bits identify the first byte of each data group and whether the packet is inverted or not. Five of the six marker bits are located in the most significant bit of each byte (each data group) of each packet, including the byte in which the checksum is located. The most significant bit of the first byte (data group) of each packet should preferably be set to 1. The most significant bit of the next four bytes (data groups) should preferably be set to 0. This labeling system allows a receiver to determine the first byte of each new packet and the bytes that follow.

The last remaining bit of the marker bits distinguishes the first packet from the second packet. The least significant bit of the fourth data group of each packet is reserved for this marker bit. This marker bit, the least significant bit of the fourth data group, should preferably be set to 1 for the first packet, the packet in which the bits are inverted. For the second packet, the identification bit is set to 0. This identification bit allows the base transceiver to distinguish between the two different types of packets. By identifying the packets, the invention can determine how the information is dispersed throughout the data and whether the information is inverted so that the invention can decrypt the remote type, the remote identification number, and the key pressed. In another embodiment of the invention, the values of the marker bits are reversed.

In one embodiment, the remote type bits, the key identification bits, the remote identification bits, the checksum bits, and the marker bits are dispersed throughout the first scrambling of the packets as follows:

First Packet for the IR Link: Conjugate. All bits are inverted except checksum

|   | 7 | 6  | 5   | 4   | 3   | 2   | 1   | 0   |
|---|---|----|-----|-----|-----|-----|-----|-----|
| 0 | 1 | T1 | K1  | I18 | I14 | I10 | I6  | I2  |
| 1 | 0 | T0 | K0  | I17 | I13 | I9  | I5  | I1  |
| 2 | 0 | K3 | I20 | I16 | I12 | I8  | I4  | I0  |
| 3 | 0 | K2 | I19 | I15 | I11 | I7  | I3  | 1   |
| 4 | 0 | C6 | C5  | C4  | C3  | C2  | C1  | C0  |

Second Packet for the IR Link: No bits are inverted

|   | 7 | 6  | 5  | 4   | 3   | 2   | 1   | 0  |
|---|---|----|----|-----|-----|-----|-----|-----|
| 0 | 1 | I0 | I4 | I8  | I12 | I16 | I20 | K3 |
| 1 | 0 | I1 | I5 | I9  | I13 | I17 | K0  | T0 |
| 2 | 0 | I2 | I6 | I10 | I14 | I18 | K1  | T1 |

-continued

|   | 7 | 6  | 5  | 4   | 3   | 2   | 1  | 0  |
|---|---|----|----|-----|-----|-----|----|----|
| 3 | 0 | I3 | I7 | I11 | I15 | I19 | K2 | 0  |
| 4 | 0 | C6 | C5 | C4  | C3  | C2  | C1 | C0 |

The remote transceiver creates the transmission data groups from the retrieved information from remote memory. The retrieved information is then dispersed throughout the first four data groups, rows 0 to 3, in the above charts. The remote transceiver calculates a checksum in order to create the checksum data group. The checksum data group is row 4 on the above charts. The remote creates two packets from the transmission data groups and the checksum data groups. The transmission data groups and checksum data group for each packet are different. The remote then transmits the two packets to the base transceiver.

After the base transceiver receives the encoded information, the base transceiver runs a validity check on at least one of the received packets, preferably the first packet. The validity check includes a most significant bits test and a checksum test. The most significant bits test ensures that the most significant bit of the first byte, or transmission data group, of at least one of the packets is set to 1. The most significant bits test also ensures that the most significant bit of the other four bytes or data groups, including both the transmission data groups and the checksum data group, of at least one of the packets is set to 0. The checksum test compares the checksum received from the remote transceiver to a checksum that the base transceiver calculates for the packet. The base transceiver can perform the most significant bits test and the checksum test on the first packet, the second packet, or both packets. Preferably, the base transceiver will perform the tests on the first packet. In one embodiment, the base transceiver does not translate the packets to determine if the remote type bits, the key identification bits, and the remote identification bits are the same. In another embodiment, the base transceiver compares the remote type bits, the key identification bits, and the remote identification bits to ensure that the values have been properly transmitted.

If at least one of the packets passes both the most significant bits test and the checksum test, the base transceiver discards the checksum data group of both packets and scrambles the transmission data groups of each packet a second time. The second scrambling is different from the first scrambling. None of the four packets have the exact same scrambling method for scrambling the remote type bits, the key identification bits, and the remote identification bits. In one embodiment, the base transceiver scrambles the first packet sent from the remote transceiver to create the first packet sent to the computer. The base transceiver scrambles the second packet sent from the remote transceiver to create the second packet sent to the computer. In another embodiment the base transceiver scrambles the second packet sent from the remote transceiver and inverts the remote type bits, the key identification bits, and the remote identification bits to create the first packet sent to the computer. The base transceiver scrambles the first packet and inverts remote type bits, the key identification bits, and the remote identification bits to create the second packet sent to the computer.

After the base transceiver scrambles the transmission data groups, the base transceiver calculates a new checksum. As mentioned above, the checksum can be calculated by adding the first four transmission data groups to determine the checksum data group that consists of the checksum. The checksum can also be calculated through the CRC and UDP methods. Again, the checksum is not inverted for any of the packets. The number of bits for the checksum will vary according to the number of bits in each transmission data group and will be determined according to method described above for the remote transceivers calculation of the checksum.

The marker bits remain in the same location in each packet. The marker bits continue to occupy the most significant bit of each byte or data group and the least significant bit of the fourth byte or data group. The marker bits also retain their same value. The most significant bit of the first byte or data group of each packet should preferably be set to 1. The most significant bit of the remaining four bytes or data groups of each packet should preferably be set to 0. As for the last remaining packet identification bit, the least significant bit of the fourth byte or data group is set to 1 for the packet that is inverted. The bit is set to 0 for the packet that is not inverted. In another embodiment, the values of the marker bits are inverted.

After scrambling the transmission data groups and calculating the checksum data group, the base transceiver creates two new packets from the transmission data groups and the checksum data group. The packets are then transmitted to the computer.

In one embodiment, the remote type bits, the key identification bits, the remote identification bits, the checksum bits, and the marker bits are dispersed throughout the second scrambling of the packets as follows:

First Packet for the COM Link: Conjugate. All bits are inverted except the checksum.

|   | 7 | 6  | 5   | 4   | 3   | 2   | 1  | 0  |
|---|---|----|-----|-----|-----|-----|----|----|
| 0 | 1 | K2 | K1  | I15 | I14 | I7  | I6 | I0 |
| 1 | 0 | K3 | K0  | I16 | I13 | I8  | I5 | I1 |
| 2 | 0 | T0 | I20 | I17 | I12 | I9  | I4 | I2 |
| 3 | 0 | TI | I19 | I18 | I11 | I10 | I3 | 1  |
| 4 | 0 | C6 | C5  | C4  | C3  | C2  | C1 | C0 |

Second Packet for the COM Link: No bits are inverted

|   | 7 | 6  | 5  | 4   | 3   | 2   | 1   | 0  |
|---|---|----|----|-----|-----|-----|-----|----|
| 0 | 1 | I3 | I4 | I11 | I12 | I19 | I20 | T1 |
| 1 | 0 | I2 | I5 | I10 | I13 | I18 | K0  | T0 |
| 2 | 0 | I1 | I6 | I9  | I14 | I17 | K1  | K3 |
| 3 | 0 | I0 | I7 | I8  | I15 | I16 | K2  | 0  |
| 4 | 0 | C6 | C5 | C4  | C3  | C2  | C1  | C0 |

The computer receives the two newly scrambled packets from the base transceiver. The computer performs the same validity check for at least one of the data packets, preferably the first data packet, as the base transceiver. The computer performs the most significant bits test and the checksum test. If at least one of the packets does not pass both tests, the packets are discarded and the computer waits for a transmission that will pass both tests. The computer can perform the most significant bits test and the checksum test on the first packet, the second packet, or both. Preferably, the computer will perform the tests on the second packet.

If one of the packets passes both of the tests, the computer performs an additional test, the comparison test. In the comparison test, the computer decodes the two packets to determine the information stored in the transmission data groups, the remote type, the key pressed, and the remote identification number. The computer compares the values obtained from each packet. If the values are not the same, the computer stores each packet that does not match and uses it for any future matches. However there is a maximum time delay for each set of packets that is also checked along with the match of key codes and remote ID numbers. Thus, the error checking is in both the bit domain and the time domain. This time domain checking is specific to this type of communication. The current maximum time delay window in the program is 250 milliseconds.

Once the computer receives a valid transmission that passes the most significant bits test, the checksum test, and the comparison test, the computer indicates that a valid response has been received. The computer can then transmit a message to the base transceiver that the computer has received the two packets from the remote transceiver.

Figure 2:
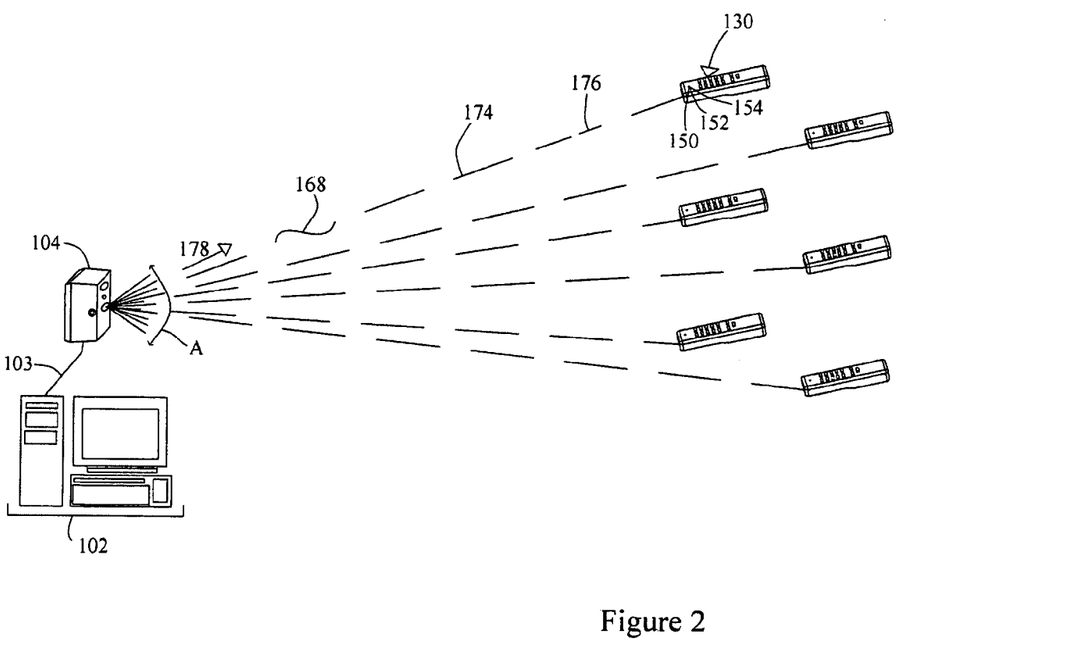
FIG. 2 is a schematic diagram of a base connected to a central processing system communicating with multiple user remotes.

For the present system, the remote receiver 104 is activated for about 10 ms following any button press such as that associated with the transmission of the student's answer. This is the time the students are pointing their remote 130 at the receiver base 104, giving a line-of-sight access to the remote 130 to collect the incoming data 170. As shown in FIG. 2, once validated, the base transceiver 104 will send a confirmation data packet 174 via a low-speed IR LED 114. In this manner, return information is provided from the base transceivers 104 to the remote transceivers 140.

As previously noted, the base 140 will send a low-speed digital data packet, approximately 10 ms for approximately 10 bits of data 174, via a light signal 168 to the remotes using an optical wavelength of about 850 nm. FIG. 2 shows a base transceiver 104 connected to a central processing system 102 communicating with multiple user remote transceivers 130. It may be understood that a remote confirmation signal 168 is sent with a remote sink data packet 174 to the remote transceivers 130. This remote sink data packet 174 includes an activation code data packet 176 and is transmitted at a second data speed 178, also known as a remote sink data speed 178.

Next, the base transceiver 104 uses a second encryption algorithm to re-encrypt the data packet and send it on to the computer 102 via the serial out port 122. Data from an adjacent base 104 may also come to the present base 104 via the serial input port 124 on its way to the computer 102.

Once the remote transceiver 130 detects the low-speed IR LED signal 168, it validates the data packet 174. If the transfer of data was complete and accurate, then the remote's sensory output device 150, shown as a light source 152 embodied in an output LED 154 which turns green for two seconds. During this time period the remote transmitter 140 is deactivated so it cannot resend data, thereby reducing the classroom traffic. If on the other hand the transfer of data was not complete, then the remote transmitter 140 transmits a similar digital data packet via the low-speed IR-LED 142. This allows multiple communication paths on crowded systems.

The computer can also send action codes to the base units 104 along the serial port data line, which are then passed on to the remotes via the base's low-speed IR LED 114. These action codes can make the remote light 152 do various things like flash green or red if the student got the answer right or wrong, respectively.

Figure 3:
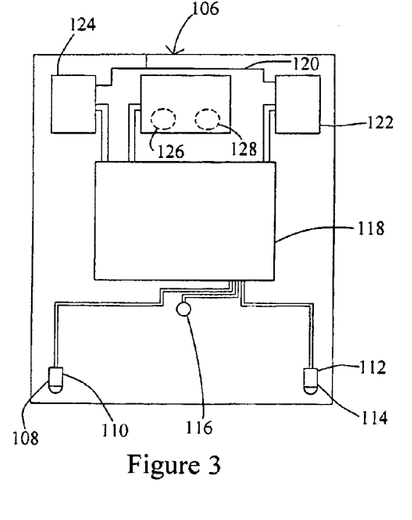
FIG. 3 is a schematic block diagram of the circuit layout for the base.

FIG. 3 is a schematic block diagram of the circuit layout for the base transceiver 104 including a base electrical circuit 106. The base electrical circuit 106 includes a base receiver 108 with a high speed sensor 110 and a base transmitter 112 with a low speed transmitting diode 114 for communicating with the remote transceivers 130. A sensory output device 116 is provided as a light emitting diode to show operation of the base transceiver 104. A central processor 118 controls the operation of the base receiver 108 and the base transmitter 112. The central processor is also connecting into a communication system 120 using a communication output port 122 and a communication input port 124 to communicate with the central processing system 102. The base transceiver 104 is powered by a power supply 126 shown as a battery 128.

Figure 4:
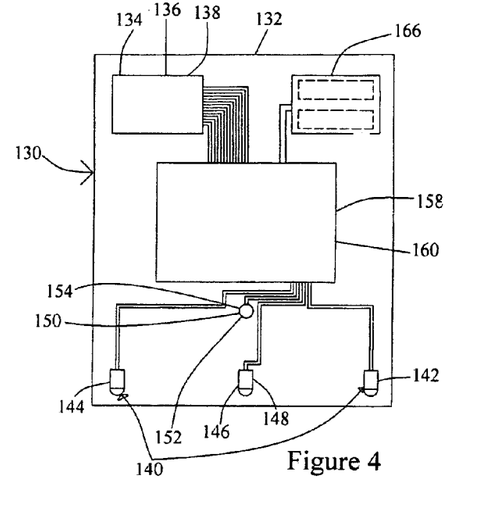
FIG. 4 is a schematic block diagram of the circuit layout for the remote.

FIG. 4 is a schematic block diagram of the circuit layout for the remote transceiver 130. The remote transceiver 130 includes a remote electrical circuit 132 including a user activated input 134, a remote transmitter 140, a remote receiver 146, and a sensory output device 150 all connected to and controlled by a remote processor 158 powered by a power supply 164.

The user activated input 134 is provided in the form of a key pad 136 having multiple inputs in the form of press button switches 138.

The remote transmitter 140 uses two systems for backward compatibility with older systems. This is provided in the form of a low speed transmitting diode 142 and a high speed transmitting diode 144.

The remote receiver 146 uses a multiple signal capable receiving sensor 148 to collect the remote sink data packet 174 from the base transceiver 104.

The sensory output device 150 is provided as a light source 152 and in the preferred embodiment takes the form of a low power consumption light emitting diode 154 capable of producing different colors for providing different output modes 156.

The remote processor 158 is adapted to control all of the components as noted above. In addition, the remote processor includes a timing device 160 for monitoring a receiver activation period for turning on and off the power to the receiver 146.

The remote transceiver 130 is powered by a power supply 164 shown as a battery 166.

Figure 5:
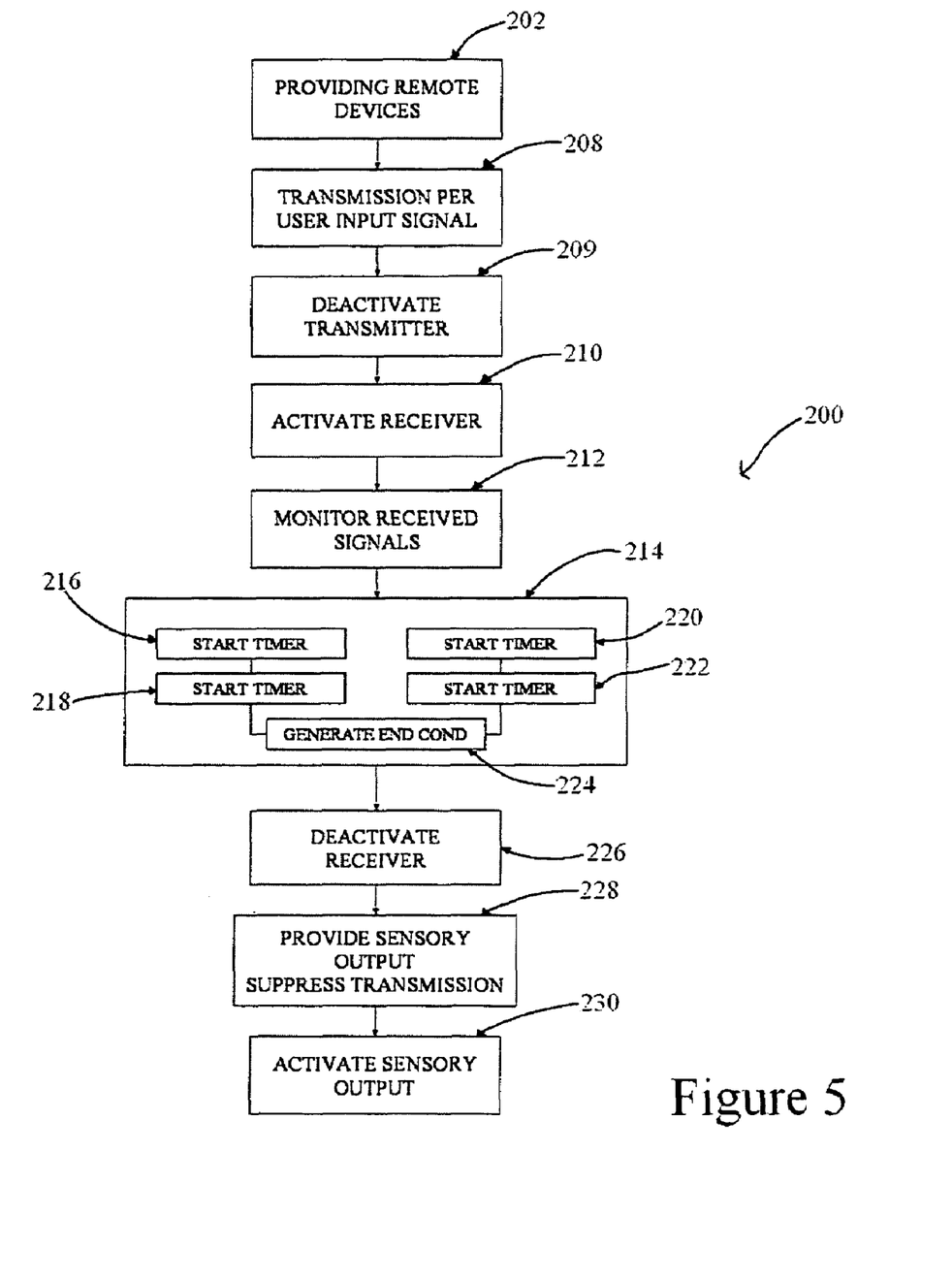
FIG. 5 is a schematic block diagram of the method for operating the apparatus.
Figure 6A:
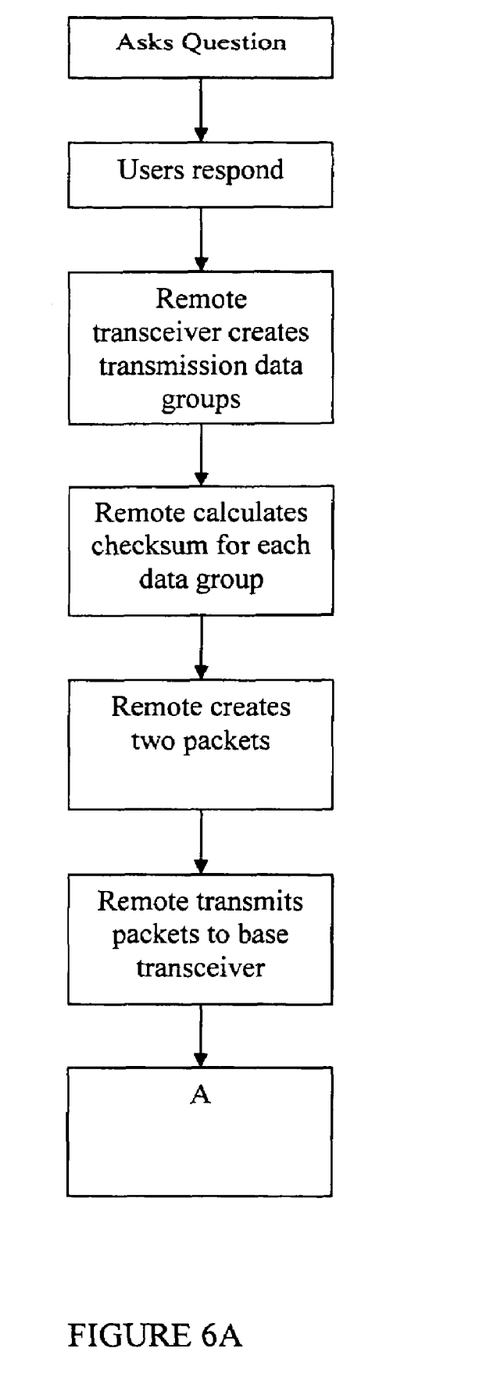
FIGS. 6A-6E are a flow chart of the data transmission process.
Figure 6B:
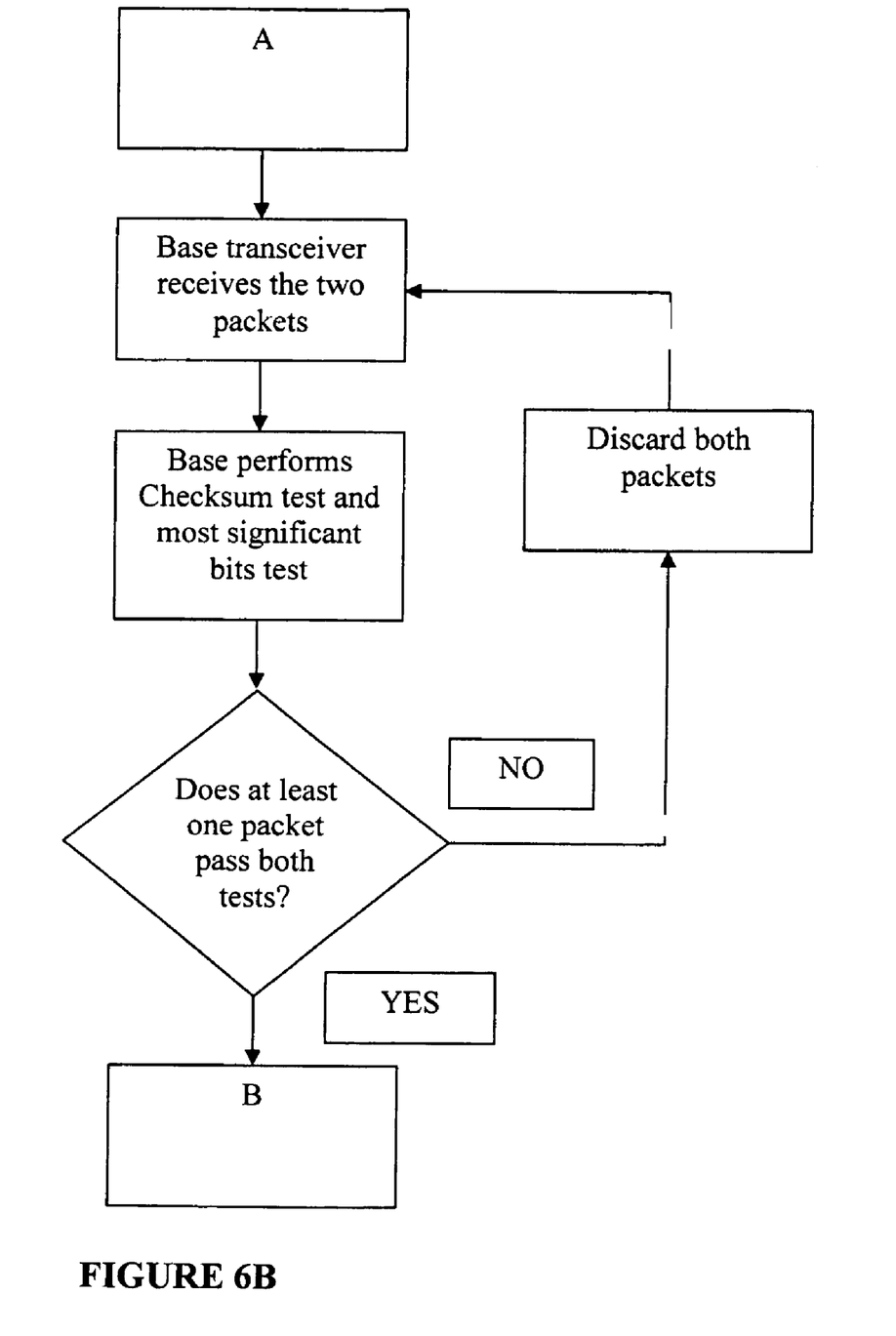
Figure 6C:
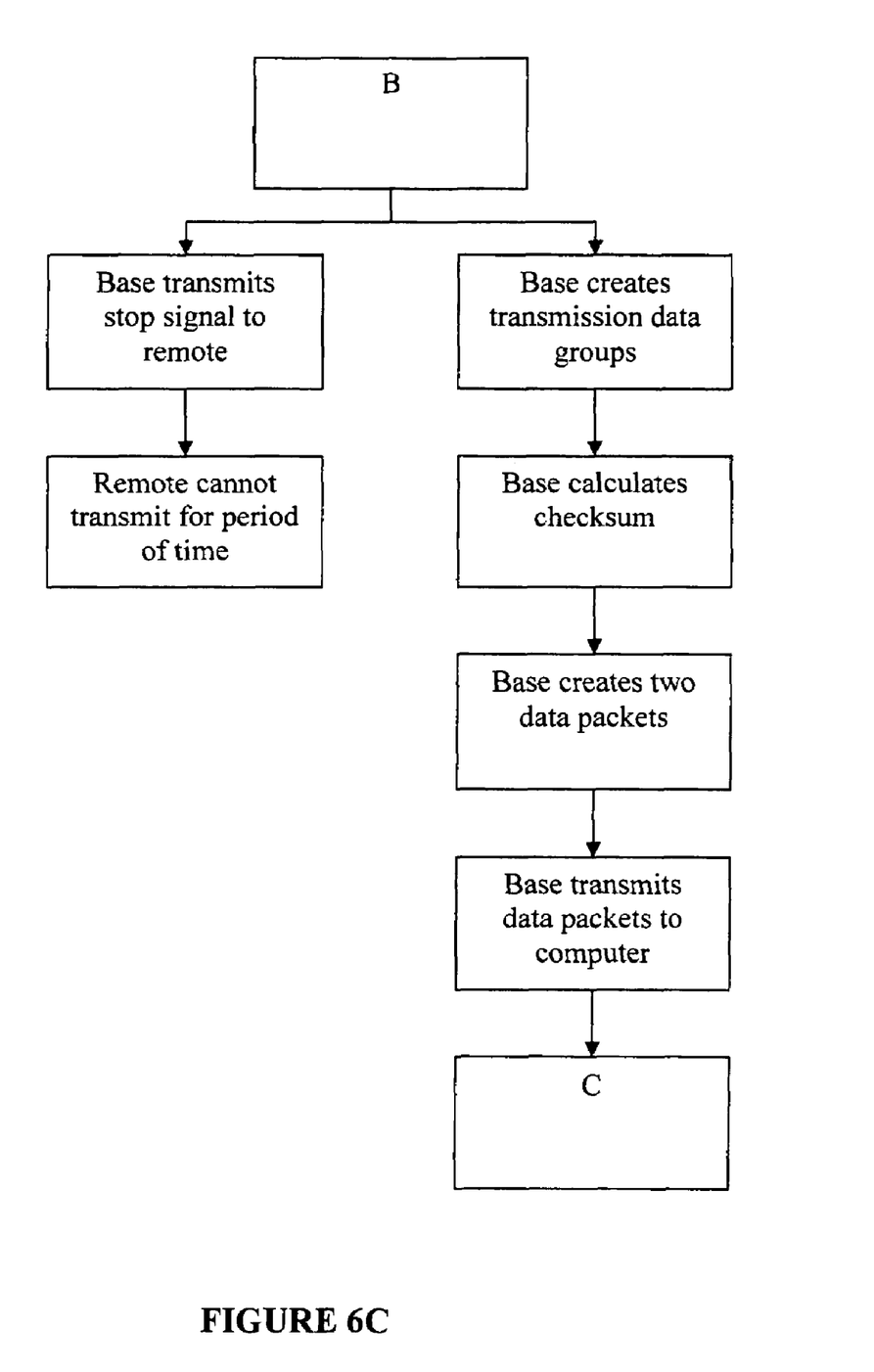
Figure 6D:
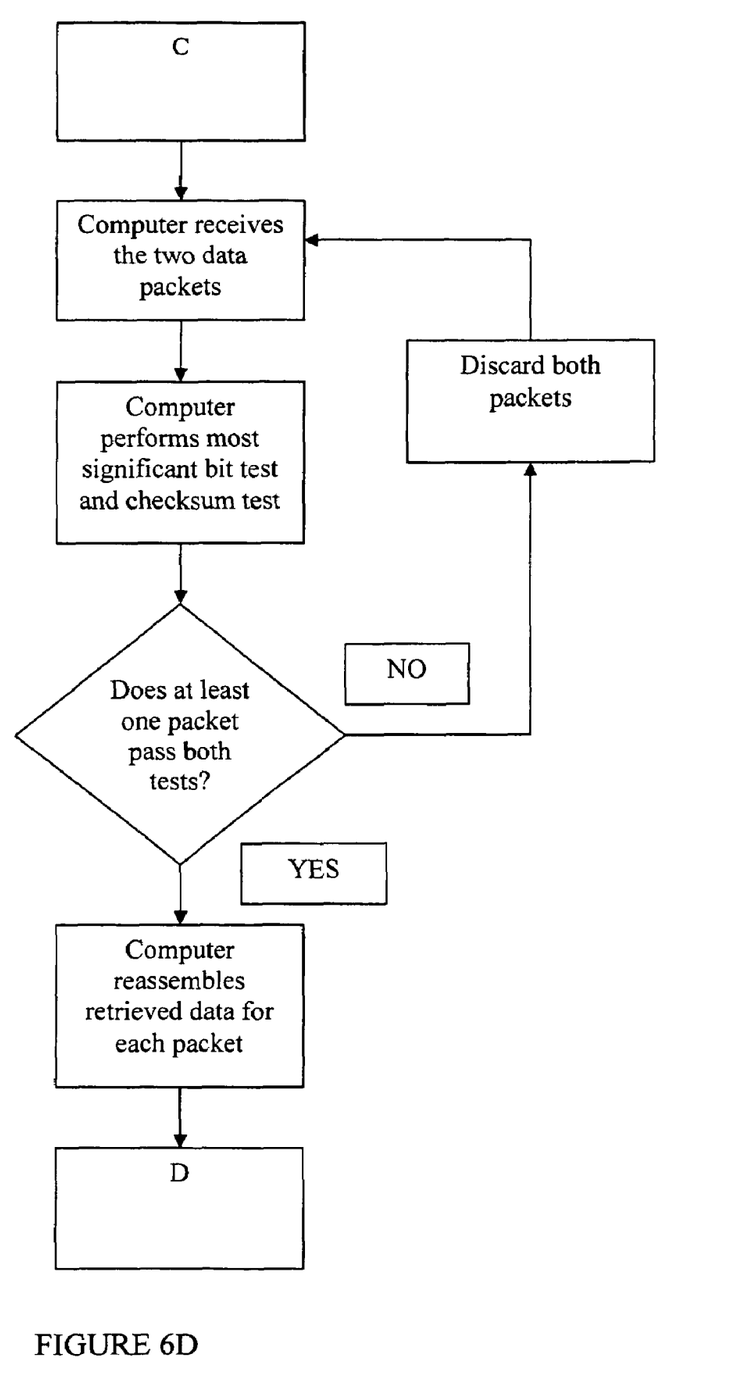
Figure 6E:
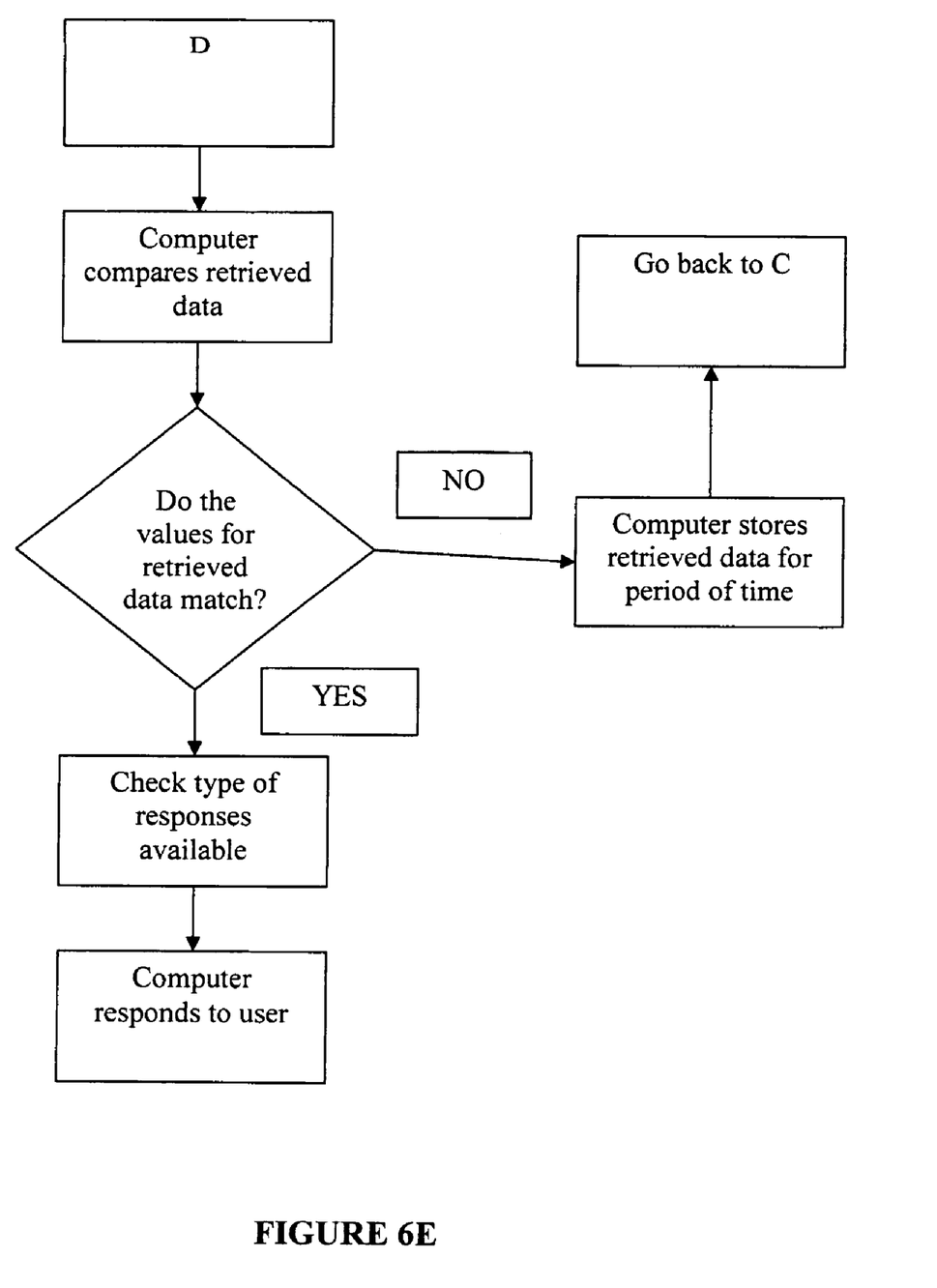

FIG. 5 is a schematic block diagram of the supplemental teaching method 200. This method 200 includes the elements of providing a remote 202, detecting an input signal 208, deactivating the transmitter 209, activating a receiving circuit 210, operating the receiving device 212, detecting an end condition 214, and then deactivating the receiver 226. Additional actions include providing a sensory output 228 and activating the sensory output 230 to provide feedback to the user.

The aspect of providing a remote 202 includes the processes for providing a transmitting device 204 and operating the transmitting device 206.

The additional aspect of detecting an end condition 214 includes two processes in the preferred embodiment including initiating a time period monitor 216 and reaching the end of a time period 218 for generating an end condition 224. An alternative aspect includes receiving a return signal 220 and checking for a valid return signal 222.

FIGS. 6A-6E are a flow chart showing one embodiment of the present invention.

The key features of the present system that are unique include:

The remote transceiver is disabled for two seconds once it receives the confirmation signal from the base unit. This stops that remote from repetitively sending IR data, which creates additional traffic that slows down the system.

The remote data allows any line-of-sight infra-red communication channel, which allows our system to be available to any remote such that the remote identifications do not need to be pre-loaded into the software and the infrared line of sight means that the system can be run in multiple adjacent rooms in one building unlike the radio frequency communication systems. By not being a diffuse IR system the data can be sent faster and more accurately.

The present system uses an inexpensive design, operating with two specific infrared wavelengths and using one-way communication protocols to build a two-way system. The optics that function at 950 nm are completely blind to the optics that function at 850 and vise versa. We chose these two specific wavelengths, so that the two signals do not interfere with each other. Slot-allocated two-way systems are more expensive to manufacture.

Another new feature is that the computer can send an action code to the remotes via the bases. The present invention's remote can be passed up to sixteen action codes by the base units, to inform the student about various things. For example, these action codes make the light output come on or flash or change colors. One action is to send an action code to make the light on the transmitters flash green if the student got the answers correct or flash red if he got the answer wrong. To pick up the signal the students will need to aim their remote toward a base and press the down arrow key on the remote. They will need to do this within a five minute period after the Professor stops the data collection.

Reference numerals used throughout the detailed description and the drawings correspond to the following elements:
a response monitoring apparatus 100
a central processor 102
a base transceiver 104
a base electrical circuit 106
a base receiver 108
high speed sensor 110
a base transmitter 112
low speed transmitting diode 114
a sensory output device 116
a central processor 118
a communication system 120
a communication output port 122
a communication input port 124
a power supply 126
a battery 128
a remote transceiver 130
a remote electrical circuit 132
a user activated input 134
key pad 136
a press button switch 138
a remote transmitter 140
low speed transmitting diode 142
high speed transmitting diode 144
a remote receiver 146
receiving sensor 148
a sensory output device 150
a light source 152
light emitting diode 154
an output mode 156
a remote processor 158
a timing device 160
a power supply 164
a battery 166
a remote confirmation signal 168
a remote source data packet 170
a first data speed, a remote source data speed 172
a remote sink data packet 174
an activation code data packet 176
a second data speed, a remote sink data speed 178
supplemental teaching method 200
providing a remote 202
providing a transmitting device 204
operating the transmitting device 206
detecting an input signal 208
deactivating the transmitter 209
activating a receiving circuit 210
operating the receiving device 212
detecting an end condition 214
initiating a time period monitor 216
reaching the end a time period 218
receiving a return signal 220
checking for a valid return signal 222
generating an end condition 224
deactivating the receiver 226
providing a sensory output 228
activating the sensory output 230

As many possible embodiments may be made of the invention without departing from the scope thereof, it is to be understood that all matter herein set forth or shown in the accompanying drawings is to be interpreted as illustrative and not in a limiting sense. The invention can function accordingly with any type of wireless or wired communications. The remote transceiver and the base transceiver can communicate through both wired and wireless communications. The base transceiver and the central processing system can also communicate through both wired and wireless communications. Furthermore, the number of bits of each packet can increase or decrease according to the amount of information to be transmitted and the need for speed. If speed is important, the number of bits can be decreased to allow for less processing of the data and shortened transmission times.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. In wireless remote units for transmission of audience response data to a central processor, a communications method comprising the steps of:
    retrieving remote ID data of at least 8 bits from remote unit memory;
    retrieving participant data of at least 3 bits from remote unit memory;
    forming a set of at least 2 transmission data groups, each of at least 4 bits from all retrieved bits of data in a manner that prevents sequences of consecutive bits in retrieved data from appearing as a transmission data group;
    including at least one marker bit in each transmission data group;

forming a checksum data group of at least 2 bits by binary calculation from said set of at least 2 transmission data groups;

forming a first data packet from a series of said transmission data groups and said checksum data group;

transmitting said first data packet.

2. The method as recited in claim 1 wherein said remote ID data of at least 8 bits consists of 10 to 30 bits.

3. The method as recited in claim 1 wherein said participant data of at least 3 bits consists of 4 to 32 bits.

4. The method as recited in claim 1 further including retrieving supplemental system data of one or more bits from remote memory.

5. The method as recited in claim 4 where said supplemental system data of one or more bits consists of 2 to 128 bits.

6. In a relay unit for retransmission of audience response data from a wireless remote unit to a central processor, a communications method comprising the steps of:

retrieving a first data packet including at least two transmission data groups received from a wireless remote unit and performing a predetermined positional translation of certain of the bits therein, excluding marker bits, to produce a set of transformed transmission data groups changed in form from that of those received from the wireless remote;

forming by binary calculation a checksum data group of at least two bits from said set of at least four transformed transmission data groups;

forming a first corn link data packet from a series of said transformed transmission data groups and the last said checksum data group;

transmitting said first corn link data packet.

7. The method as recited in claim 6 wherein said checksum data group of at least two bits comprises at least seven bits.

8. The method as recited in claim 6 further including the steps of retrieving a second data packet including at least two transmission data groups received from a wireless remote unit immediately following receipt of said first data packet and performing a predetermined positional translation of certain of the bits therein, excluding marker bits, to produce a set of transformed transmission data groups changed in form from that of those received in the second data packet from the wireless remote;

forming by binary calculation a checksum data group of at least two bits from said set of transformed transmission of data groups produced from said second data packet;

forming a second corn link data packet from a series of the transformed transmission data groups and the checksum data group derived from said second data packet;

transmitting said second corn link data packet.

9. The method as recited in claim 8 wherein each said checksum data group of at least two bytes comprises at least seven bytes.

10. The method as recited in claim 8 wherein the predetermined positional translation for said second data packet is different from the predetermined positional translation for said first data packet.

11. In wireless remote units for transmission of audience response data to a central processor, a communications method comprising the steps of:

retrieving remote ID data from remote unit memory;

retrieving participant data from remote unit memory;

forming a first set of transmission data groups from all retrieved bits of data in a manner that prevents sequences of consecutive bits in retrieved data from appearing as a transmission data group;

forming a checksum data group from said first set of transmission data groups;

forming a first data packet from said transmission data groups and said checksum data group; and transmitting said first data packet.

12. The method of claim 11 wherein the transmission data groups include at least one marker bit in each transmission data group.

13. The method of claim 11 wherein the checksum data group includes at least one marker bit.

14. The method of claim 11 wherein the method further comprises:

Retrieving supplemental system data from remote unit memory and including supplemental system data in the transmission data groups.

15. The method of claim 11 further comprising:

forming a second set of transmission data groups from all retrieved bits of data; arranging bits of said second set of transmission data groups in a predetermined fashion such that the second set of transmission data groups is different from the first data group;

calculating a second checksum data group from the second data transmission data groups;

creating a second packet containing the same number of bits as the first packet, said second packet containing the second transmission data groups and the second checksum data group; and transmitting said second packet.

* * * * *